(12) United States Patent
Wong et al.

(10) Patent No.: US 7,475,655 B2
(45) Date of Patent: Jan. 13, 2009

(54) ABSORBENT COMPOSITION AND EXTENDED USE PET LITTER

(75) Inventors: Vincent Y. Wong, Hamilton, OH (US); Leonard E. Small, Cincinnati, OH (US); Alice M. Ward, Middletown, OH (US); Richard J. Sackenheim, Hamilton, OH (US)

(73) Assignee: The Iams Company, Dayton, OH (US)

( * ) Notice: Subject to any disclaimer, the term of this patent is extended or adjusted under 35 U.S.C. 154(b) by 0 days.

(21) Appl. No.: 11/348,874

(22) Filed: Feb. 7, 2006

(65) Prior Publication Data

US 2006/0124069 A1 Jun. 15, 2006

Related U.S. Application Data

(62) Division of application No. 10/274,501, filed on Oct. 16, 2002, now Pat. No. 7,059,273.

(60) Provisional application No. 60/329,784, filed on Oct. 16, 2001.

(51) Int. Cl.
*A01K 29/00* (2006.01)
(52) U.S. Cl. .................................................. 119/171
(58) Field of Classification Search ......... 119/171–173, 119/28.5; 502/405; 424/76.6, 76.3, 76.4
See application file for complete search history.

(56) References Cited

U.S. PATENT DOCUMENTS

| | | | |
|---|---|---|---|
| 4,009,684 A * | 3/1977 | Kliment et al. | 119/172 |
| 4,206,718 A | 6/1980 | Brewer | |
| 4,494,482 A * | 1/1985 | Arnold | 119/173 |
| 4,727,824 A | 3/1988 | Ducharme et al. | |
| RE32,649 E | 4/1988 | Brandt et al. | |
| 4,883,021 A | 11/1989 | Ducharme et al. | |
| 5,014,650 A * | 5/1991 | Sowle et al. | 119/171 |
| 5,152,250 A | 10/1992 | Loeb | |
| 5,176,107 A | 1/1993 | Buschur | |
| 5,188,064 A * | 2/1993 | House | 119/172 |
| 5,207,830 A * | 5/1993 | Cowan et al. | 106/672 |
| 5,339,769 A * | 8/1994 | Toth et al. | 119/173 |
| 5,359,961 A * | 11/1994 | Goss et al. | 119/173 |
| 5,371,054 A | 12/1994 | Pluta et al. | |
| 5,452,684 A * | 9/1995 | Elazier-Davis et al. | 119/173 |
| 5,526,771 A * | 6/1996 | Ito | 119/172 |
| 5,577,463 A * | 11/1996 | Elazier-Davis et al. | 119/173 |
| 5,823,139 A * | 10/1998 | Ito | 119/171 |
| 5,830,765 A | 11/1998 | Santioemmo et al. | |
| 6,089,190 A * | 7/2000 | Jaffee et al. | 119/173 |
| 6,220,206 B1 | 4/2001 | Sotillo et al. | |
| 6,308,658 B1 | 10/2001 | Stecle | |

\* cited by examiner

*Primary Examiner*—Son T. Nguyen
(74) *Attorney, Agent, or Firm*—Cynthia L. Clay; SarahAnn Dressel; Roddy M. Bullock

(57) ABSTRACT

The invention provides compositions for use as pet litters and pet bedding, or for absorption of liquids and gases. These compositions are formed as aggregates or agglomerates of different components having different hydration capacities and 5 hydration rates.

9 Claims, 1 Drawing Sheet

ABSORBENT COMPOSITION AND EXTENDED USE PET LITTER

RELATED APPLICATIONS

This application is a division of U.S. patent application Ser. No. 10/274,501 filed Oct. 16, 2002, now U.S. Pat. No. 7,059,273 which claims the benefit of U.S. Provisional Patent Application No. 60/329,784, filed Oct. 16, 2001.

FIELD OF THE INVENTION

The invention relates to absorbent compositions, particularly those compositions having utility in pet litter or pet bedding formulations and as absorbents for liquids and vapors.

BACKGROUND OF THE INVENTION

Pet owners, particularly cat owners, dislike the unpleasant routine of maintaining a clean environment by containing and disposing of animal waste. Generally, cats are trained to defecate and urinate in a litter box, which is supplied with some type of disposable litter. The litter can be composed of a number of different materials. Some litter formulations include bentonite clay or silica gel to absorb feline urine and allow the cat to bury its feces. These may be objectionable to some individuals who are worried about the potential health effects of bentonite or silica dust on themselves or their pets. Furthermore, some individuals who have allergies to certain types of dust also find it difficult to use these products. Other formulations are made of ground grain, such as wheat, or ground corn cob. Generally, unprocessed grains provide limited absorption of aqueous material such as urine and must therefore be supplemented with an additional material for absorption of the urine in order to provide adequate performance. U.S. Pat. No. 4,727,824 describes a cellulosic hull material (cereal grain hulls, peanut hulls, soybean, rapeseed, sunflower, or cottonseed hulls) in combination with a nitrogenous compound absorber (cyclodextrin). U.S. Pat. No. 4,883,021 describes a litter formulation comprising plant pulp, cereal grain hull, and a polyacrylate polymer (polyglycerol acrylate or polypropyl acrylate) to absorb nitrogenous waste.

Many litters have been formulated to provide a clump when contacted with urine. The clump can be removed, thereby removing the urine from the litter box. These litters have been developed to address the common problem of very unpleasant odor in the litter box due to urine accumulation. In addition to the aesthetic effect for the human owner, presence of urine odor in the litter box also creates an effect on the cat, often causing it to avoid the box and urinate in undesirable places. Some cats have even been known to avoid urinating because the box is so offensive, resulting in a detrimental health effect on the cat.

Clumping litters utilize a number of different materials, including bentonite clay, corn cob, corn, and wheat. U.S. Pat. No. 5,152,250, for example, describes a clumping litter comprising a biodegradable carrier such as granulated peanut shells, having grain flour and mineral oil intermixed therewith to provide a clumping effect. U.S. Pat. No. 5,176,107 describes a clumping litter comprising particular material having a liquid-responsive, adhesive material mixed with a sorbent material in particulate form. U.S. Pat. No. 4,206,718 describes a litter composition formed of alfalfa combined with a gelatinizable carbohydrate, such as flour. While these litters do provide a means for removal of clumps of litter containing appreciable amounts of urine, they also require regular maintenance consisting of sifting through the litter material and scooping out the clumps. Many pet owners find this duty unpleasant enough to avoid it, choosing instead to dispose of the entire contents of the litter box at regular intervals. This can actually increase costs, since accumulation of clumps makes it difficult for the cat to dig in the box and necessitates more frequent changes of litter.

With most non-clumping litters, urine accumulates in the litter and necessitates frequent disposal due to excessive unpleasant odor. Therefore, the pet owner must generally choose between regular scooping or regular disposal. Both require significant maintenance time and are unpleasant.

What is needed is an absorbent composition that provides a low-maintenance pet litter to manage urine absorption and odor and decrease the frequency of litter disposal.

SUMMARY OF THE INVENTION

The present invention relates to an absorbent composition that provides relatively high capacity absorption of liquids, particularly feline urine, to enable extended use in conjunction with decreased maintenance.

The present invention provides an absorbent particle formed of at least one moderate-absorption carrier and at least one high-capacity absorption material. The invention further provides an absorbent particle formed of at least one moderate absorption carrier and at least one high-capacity absorption material, wherein the moderate absorption carrier is agglomerated with the high-capacity absorption material. The present invention also provides for an absorbent particle suitable for waste collection, including the collection of urine, including feline urine.

The present invention provides for particles of a size less than approximately 40 mesh, or less than approximately 60 mesh.

The present invention provides a high capacity absorption material comprised of a hydrogel-forming polymer, such as AGM. The hydrogel-forming polymer is present in the particles of the present invention at a level from about 3-15 percent by weight, or about 8-10 percent by weight.

The invention also relates to a method of forming an absorbent composition by processing a gain product, citrus product, or other bio- or synthetic polymer to provide a higher hydration rate after processing, and combining that processed product with a second component having an at least 2× higher hydration capacity than that of the first product.

An especially effective embodiment of the invention utilizes a second component having at least 2×, and more preferably at least 8-10×, higher hydration component. To achieve the desired effect, it is also preferable to provide the first component in at least 2× the amount of the second component and to form an agglomerate of the two components.

Alternately, the composition comprises a two-particle system in which one particle embodies high capacity absorption properties and the other particle embodies moderate capacity absorption with a desired ability to withstand particle change after repeated dosing. Both particles comprise agglomerates of major components with moderate to high hydration capacity and at least one minor component with high hydration capacity.

In one embodiment of the invention, major components of the agglomerates have fast hydration rate with high to moderate hydration capacity, while minor components of the agglomerates have more moderate hydration rates but high to very high hydration capacity, as determined by their ability to absorb liquid at several times their weight. The present invention further provides a particle, wherein the moderate absorption carrier provides a rapid uptake of liquid when exposed to liquid material.

In particular embodiments of the invention, the moderate absorption carrier, or major component, may be formed of ground whole corn, partially gelatinized corn, ground corn, derivative forms of corn, derivative forms of corn from thermomechanical processing such as extrusion, citrus peel, ground citrus peel, a derivative of citrus peel, processed ground citrus peel, or a combination of two or more. Materials which may be processed to increase hydration rate and/or capacity include, but are not limited to, corn, corn cob, wood, sawdust, citrus pulp/fiber, processed paper such as newspaper, wheat, rice, fruit or vegetable pulp or skins, nut or bean shells (e.g., peanut shells, cocoa shells, etc.), and cellulosic portions of herbaceous plants (e.g., stems, leaves).

The absorbent particles of the present invention may also comprise one or more of the following: pre-gel starch, odor-reducing agents, indicators, antimicrobial agents, and antifungal agents. The high-capacity absorption material may be an absorbent material that absorbs aqueous liquids at least two to preferably more than five times its own weight.

The present invention further provides for particles that do not change in size following exposure to liquid. The present invention also provides particles that do not contain bentonite or silica.

Also provided by the present invention is a pet litter comprising a plurality of particles as described hereinabove.

Further provided by the present invention is a method for collecting animal waste, comprising contacting a plurality of particles as described hereinabove, with animal waste, and allowing the particles to absorb the waste.

Additionally provided by the present invention is a method for absorbing petroleum, comprising contacting a plurality of particles as described hereinabove, with petroleum, and allowing the particles to absorb the petroleum.

Also provided by the present invention is a method for absorbing liquid material from an area, comprising contacting a plurality of particles as described hereinabove, with liquid material, and allowing the particles to absorb the liquid material. The area may be a residential dwelling.

The present invention further provides an agglomerate particle bed for absorbing fluid comprising agglomerate particles comprising one or more of a first particle having a rapid hydration rate and moderate to high hydration capacity and one or more of a second particle having a hydration rate that is slower than that of the first particle and a hydration capacity that is at least two times higher than that of the first particle. Also provided by the present invention is an agglomerate particle bed for absorbing fluid, comprising a plurality of particles as described hereinabove.

The present invention further provides a pet litter composition comprising a plurality of particles having an absorbency of at least 5 ml liquid/gm pet litter or greater. The present invention also provides a pet litter composition comprising a plurality of particles having an absorbency of at least 6 ml liquid/gm pet litter or greater.

DETAILED DESCRIPTION

Figure 1:
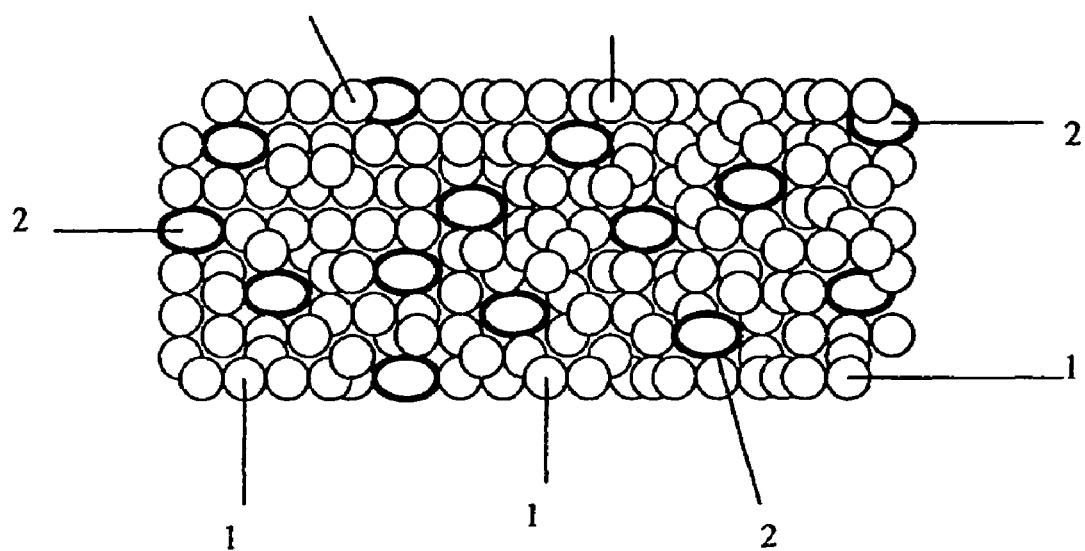
FIG. 1 is a cross-sectional view of an agglomerate as described by the present invention. The agglomerate is formed of at least one major component 1 and at least one minor component 2.

The inventors have developed an organic-based cat litter that is substantially bentonite- and silica-free. It is less dense than bentonite-based litters, and therefore provides greater ease of use due to its decreased weight. Although some other organic-based litters are also lightweight, they generally require a higher level of maintenance due to poor malodor control, low moisture absorbency, or significant changes in particle form after use. Several become very sticky and difficult to remove from the bottom of the litter pan. The pet litter of the present invention provides the benefit of being lightweight in combination with good control of urine odors, good absorption of urine, and a drier feel to the surface of the litter after use, resulting in less tracking.

The compositions described by the present invention lend themselves to extended use and less maintenance by providing pet litter comprising agglomerates that dry relatively quickly at the surface, has a very high capacity for urine while substantially maintaining their original form after absorbing urine, and reduce odor by contacting the urine with an odor-reducing element (e.g., activated carbon).

The inventors have discovered that agglomerating two or more materials or particles with different hydration rates and hydration capacities provides a pet litter with greater absorption capability, particle stability, and odor control than litters comprising either one single material, such as bentonite clay, or two or more materials which are not chosen for their hydration potential.

As used herein, the term "hydration capacity" is used interchangeably with "absorption capacity." It should be noted that "absorption capacity" is often used in the art to refer to the amount of a fluid in general that can be absorbed by a material, and "hydration capacity" is more specifically used when the fluid is water.

In the present invention, the absorption capacity is expressed as ml water/gm cat litter, or the total volume of fluid absorbed by the cat litter divided by its weight. The absorption capacity was measured using a dynamic test where a 0.9% saline solution at 101° F. was poured over a 20 gm sample of cat litter that had been placed in a Buchner funnel fitted with a Whatman glass filter. The absorption capacity was reached when the cat litter could no longer absorb any more fluid poured through the bed and excess water passed through the funnel.

Absorptive products of the present invention typically have absorption capacities of about 4 to 10 ml water/gm product, more preferably 6-8 water/gm product, and most preferably about 7 ml water/gm product. The absorptive capacity of the products of the present invention after three weeks of use and intermittent absorption is about 4-8 ml water/gm product, more preferably about 5-7 ml water/gm product, and most preferably about 6.2 ml water/gm product. By comparison, current commercial litter compositions have absorptive capacities of about 3.5 ml water/gm product, decreasing to about 2.5 ml water/gm product after 3 weeks of use.

Particle stability refers to the ability of the particle to resist physical or functional changes after repeated usage. This property is a function of the product's water absorption capacity with usage and its tendency to form agglomerates with repeated use. The product of the present invention provides minimal water absorption changes while it also resists formation of agglomerates with standard use (approximately three weeks of intermittent wetting, simulating the pattern of cat litter use by a household feline pet). By contrast, commercially available litter products produce approximately 15-26% agglomerates with repeated use, requiring removal of the agglomerates for extended use.

"Rapid uptake of liquid," as used herein, is determined from ml water absorbed/gm cat litter per unit time, where a rapid uptake of water would result in very little water/urine in the bottom of bed of absorbent product. When used as an absorbent in a cat litter pan, the rapid uptake of liquid provided by the product of the present invention decreases the amount of urine that may accumulate in the bottom of the pan. Since this unabsorbed urine is a major source of odor in a litter box, the product of the present invention provides an absorbent for use in a litter box that is less offensive to the human pet owner and to the feline pet, which may resort to use of undesirable areas of the household for urination and defecation if offended by strong litter box odor.

The materials or products of the present invention may be formed of ground whole corn and derivative forms from thermomechanical processing such as extrusion, ground citrus peel or processed ground citrus peel, or a combination of both. Materials which may be processed to increase hydration rate and/or capacity include, but are not limited to, corn, corn cob, wood, sawdust, citrus pulp/fiber, processed paper such as newspaper, wheat, rice, fruit or vegetable pulp or skins, nut or bean shells (e.g., peanut shells, cocoa shells, etc.), and cellulosic portions of herbaceous plants (e.g., stems, leaves). Surplus absorbent materials formed during the production of webbing, diaper making, or other paper-making operations may also be used to form the product of the present invention.

Furthermore, the inventors have discovered that including a high-capacity absorbent material, such as but not limited to, the absorbent gelling material (AGM) described in U.S. Reissue Pat. No. 32,649 (Brandt, et al.) or other hydrogel-forming polymers or absorbent materials, including, but not limited to carboxymethyl cellulose or hydroxy ethyl methylacrylate. Inclusion of a high-capacityabsorbent material at a level of from about 3 to about 15, and especially about 8 to about 10 percent by weight, produces a particle or agglomerate that can absorb significant amounts of urine while providing multiple dosing capabilities due to the ability to dry between dosings. The drier particle surfaces also provide a benefit in that they produce a drier feel to the litter relatively soon after the cat has urinated in the box, and reduce tracking of wet litter to sites outside the box.

"Agglomerate" is meant to include any assemblage of particles with some association physically, such that they are either loosely or rigidly held together. The process of forming agglomerates includes any action or process of gathering particulate matter in a conglomerate. Typically, the agglomerates take the form of pellet, crushed pellet, or any regular or irregular-shaped adherent or substantially adherent, or compacted admixture of particles, particularly those formed by roll compaction, pelletization, extrusion or other means known to those of skill in the art.

As used herein, the terms "absorbent agglomerate particle," "particle agglomerate," and "agglomerate particle" are used interchangeably.

It will be appreciated that particle size and shape are, to a great extent, determinative of the desired properties or end use of the product (urine and odor absorption, flow-ability, or aesthetics, for example). Desired final particle size of agglomerate size or shape is also a consideration when defining the raw materials for making the product. For example, a typical application of the present invention is for use as cat litter. Thus, the "agglomerate" or "particle agglomerate" in a cat litter bed can be a pellet (cylindrical or other shape) of about 2 mm by about 3 mm. The size and shape of the agglomerate, however, is determined according to the use of the material, and can be altered by one of skill in the art to optimize the use. For example, the size and shape of the agglomerate can be altered to maximize fluid absorption rate, odor absorption rate (e.g., optimizing surface/volume ratio), ability to flow freely from a container and cover the cat litter bed evenly, texture/feel to the cat paw, or packing density. Agglomerate size can also be adjusted to minimize formation of dust, to minimize surface area in order to minimize clumping, or to minimize tracking of the litter from the litter pan to other areas of the home.

A litter composition of the present invention will comprise at least two materials with different water absorption, or hydration, properties. At least one major component will have fast hydration properties, while not necessarily having a high hydration capacity. At least one minor component will have a high hydration capacity, with a moderate to fast hydration rate. While not being bound by theory, the inventors have determined that combining the two particles can provide rapid uptake of moisture by the major component, which can then transfer the moisture to the material with the higher absorption capacity. By sequestering the higher hydration capacity material within an agglomerate comprised of the major component, the minor component, and, optionally, additional components for odor control, bacterial control, or other purposes, the litter composition can be made to form substantially few or small clumps, which can break apart readily when at least moderately dry. Sequestering the higher hydration capacity material within the agglomerate also provides the advantage of drawing the moisture into the agglomerate, resulting in a drier feel to the surface of the agglomerate. Additionally, the agglomerate does not fall apart even after extended usage since the moisture level in the base material does not exceed a critical level where it begins to lose structure. Thus, maintenance time for an extended time period is not required due to the litter's unique ability to have maintain a high urine absorption capacity and a high resiliency to exhibit significant physical changes (reduced clumping, reduced break down of the agglomerate, fast surface drying) even after repeated doing.

The particle agglomerates of the present invention typically have a reduced swelling effect, as compared to the currently available pet litter materials, enabling the agglomerate to resist changes to its size after multiple uses. With conventional cat litter, the particles or agglomerates swell and form larger agglomerates or clumps when wetted. These agglomerates have a reduced surface area and reduced hydration capacity or absorptive capacity, resulting in a decreased overall ability of a quantity of litter to continue to absorb fluid, particularly urine, after repeated use.

Faster hydration properties can be obtained when the base material in the agglomerate has an ability to swell slightly when wetted. This can be accomplished, for example, by cooking ground whole grain corn in order to cause partial gelatinization of its starch component 1. For example, milled whole grain corn can be passed through a twin screw cooking mixer, such as a Readco® mixer. The cooked corn can then be dried and milled into flour, with a particle size of, for example, approximately less than 40 mesh, or 420 microns. The particle size more preferably being less than approximately 60 mesh, or 250 microns. Optimum results can be obtained when particle size is less than about 0.02 inches, and preferably 0.01 or finer (less than 500 microns (35 mesh), and preferably less than 250 microns). In this application, all reference to mesh size is intended as reference to U.S. standard size. Partial gelling is desired, rather than a higher degree of gelling, because excessive gelatinization will cause the pellet to clump when wetted. Surprisingly, further reduction of clumping can be achieved by the addition of about 1% of a pre-gel starch (Instant CleanJel, National Starch, a waxy maize base). Pre-gelatinized starch is generally preferred as a component of the product of the present invention, because pre-gel starches swell in cold water, while normal starches will not swell until the gelatinization temperature is reached. The gelatinization temperature of normal starches is generally higher than ambient temperature.

An alternate material for use in the composition of the present invention is citrus peel. Reportedly, cats do not like the smell of citrus. To diminish this effect, citrus smell can be reduced by milling citrus peel through a Stedman Machinery cage mill to 60 mesh or less. Further reduction in citrus odor is accomplished by pelletizing the product.

The pellet hardness affects its absorptive capacity for water. Those of skill in the art will recognize that pellet hardness is affected by the moisture content of the mix and by the compressive force used in making the pellet. In the pelletization process a compression ratio is commonly used as a process parameter variable. The compression ratio is defined as the total distance the material is being compressed (pressway) divided by the hole diameter. Different compression ratios will be used for different materials that one may choose to use in the composition of the present invention. Excessive compression can actually decrease absorption, since it reduces the internal void spaces that can hold water within the agglomerate. The final particle will have a density of about 15 to about 50 pounds per cubic foot and preferably about 20 to about 30 pounds per cubic foot.

Those of skill in the art will also recognize that, given the disclosure by the inventors of a method of making a pet litter by agglomerating two materials with different absorption-capacity, and especially by sequestering the higher capacity material within the agglomerate rather than placing it solely on the surface or simply admixing the two types of particles, it is possible to produce a pet litter composition of the present invention utilizing a number of different plant or synthetic materials. What is preferred is that the major component of the agglomerate has a hydration capacity that is at least about 2× that of the minor component. AGM, for example, has a hydration capacity that the inventors have determined to be at least approximately 8 times more absorbent than that of milled corn. In this way, an agglomerate bed can be formed in a container such as a litter box such that fluid, such as urine, can flow over the agglomerates and be absorbed quickly into the—agglomerates, leaving little to no fluid to seep to the bottom of the container or litter box. During repeated use, the minor component of the agglomerates adds hydration capacity to the agglomerates, giving the agglomerate bed a drier feel and appearance, as well as a greater capacity to absorb added fluid.

For malodor control, it is beneficial to incorporate an odor reducing agent or element or odor-control agents or materials. Odor reducing agents, such as activated carbon, or steam activated anthracite, in particular, into the agglomerate. As the biomaterial provided by the corn or citrus absorbs urine, the carbon within the agglomerate adsorbs malodorous materials in the urine. To those of skill in the art, it is apparent that other materials may be substituted for carbon for achieving odor control. These materials include, but at not limited to, molecular sieve materials such as zeolites and silica gel, for example. Odor-control materials, such as baking soda, for example, are well known to those of skill in the art. Fragrance may also be added.

Those of skill in the art will also appreciate that antimicrobial or anti-fungal compositions may be added to the compositions of the present invention in order to limit multiplication of bacteria and fungi, for example, in the litter composition.

Additionally, it will be apparent to those of skill in the art that the compositions of the present invention lend themselves to the addition of materials for use as indicators of feline disease. For example, indicators of feline urinary tract disease for use in animal litter compositions are described, for example, in U.S. Pat. Nos. 6,308,658; 5,830,765; and 5,371,054, and indicators such as these may be added to the compositions of the present invention. Indicators may be added to detect the presence of chemicals present in the urine as a result of feline diabetes, urinary tract infection, or other disease, for example.

It should also be appreciated that the absorptive and adsorptive properties of compositions of the present invention lend themselves to providing a benefit for a variety of other uses, as well. For example, compositions of the present invention can be useful for absorbing unwanted petroleum or other unwanted materials at industrial, waste disposal, or other sites. They may also be useful for removing excess moisture from areas such as residential dwellings, or basements, where water—may accumulate and be more difficult to remove. Particularly where the fluid to be absorbed contains offensive odor, a composition such as that described by the present invention and comprising activated carbon as an ingredient can be useful.

EXAMPLES

Example 1

Corn flour was dry mixed with a highly absorbing material (AGM)(Aldrich, Milwaukee, Wis., U.S.A.). Corn flour comprised 97% and AGM comprised 3% of the dry mix. The mix was metered into a 2-inch Readco twin screw mixer at 16 lbs/hr. Water was added at 4 lbs/hr. To induce gelatinization of the corn flour, the three temperature zones within the Readco mixer were maintained at 82, 201 and 170 degrees Fahrenheit, respectively. This was accomplished by heating the external jacket at 160° F. and by operating the mixer at a screw speed of 150 rpm. The product was then extruded through a die plate with 2 mm diameter holes, providing minimal expansion when exiting the die plate. The extrudate was then oven dried overnight at 210° F. After drying, the product was granulated by milling through a Quadro mill. This product formed a hard clump when dosed with 20 ml of 1% saline solution, and would be useful for those desiring a clumping litter with high moisture absorption capacity.

Example 2

A pet litter product comprising two particles with distinct functional properties provided the ability to absorb a high amount of moisture at a very fast rate, yet form weak agglomerates when wetted. This was accomplished by admixing a first set of particles with high absorbance capacity and rate of hydration, comprised of 84% modified corn, 10% AGM, 5% activated charcoal, and 1% pre gel starch, with a second set of particles having a high moisture capacity with moderate rate of hydration and little tendency to clump, formed of 85% citrus peel, 10% AGM, and 5% activated charcoal (Puurfectly Fresh®, Calgon). The hydration properties of the first particle provide an absorption rate that is fast enough to prevent fluid from reaching the bottom of the litter pan when the litter depth is 1.5 inches deep, minimizing the opportunity for litter to stick to the bottom of the pan. The highly fibrous base material (citrus peel) of the second particle resists physical changes after wetting, minimizing clumping and providing the ability to withstand multiple dosing with little or no physical change to the pellet. Admixing the two particle components in a from about 50/50 to about 75/25 corn/citrus ratio provided a product with fast water hydration and substantially no clumping, or clumps that fell apart readily, and, when dry, could be re-wet.

When tested against non-clumping clay and clumping clay, the composition of the present invention was evaluated as shown in Table 1:

TABLE 1

| Characteristic | Present Invention | Non-clumping Clay | Clumping Clay |
|---|---|---|---|
| Surface wetness (sensory: 1-10, dry-wet) | 1.9 | 3.2 | 8.1 |
| Malodor (Ammonia Model: 1-10, low-high) | 1 | 6 | 10 |
| Absorbency (ml liquid/g bulk Solid) | 6.6 | 1.3 | 3.0 |
| Absorbency (ml liquid/ml bulk Solid) | 3.96 | 1.04 | 2.7 |
| Bulk Density (g/ml) | 0.6 | 0.8 | 0.9 |

Example 3

A modified corn base product was formed by partially gelatinizing ground corn in a cooker-extruder. This gelatinized product was then dried and milled to a size less than about 60 mesh so that it could be admixed with other ingredients for pelletization. The milled corn was admixed with AGM and activated charcoal, at a ratio of 95:2:3 percent by weight, respectively. Water at ambient temperature was added in an amount necessary to achieve good pelletization, or about 10% of the dry mix level. The mix was pelletized into cylinders with a 2×3 mm dimension by processing the mix through an LCI Model 14-171 pelletizer. The compression ratio (ratio of die plate thickness to pellet diameter) was 4:1. Pellets were then dried to—less than 5% moisture. As shown in Table 1, urine absorption for this processed grain product of the present invention (referred to as "Leo II") is significantly increased over a three-week period as compared to a leading ground grain product (World's Best®Cat Litter, Grain Processing Corp., Muscatine, Iowa, U.S.A.).

TABLE 2

Absorbency Ratios: Leo II/World's Best*

| Day | Relative Absorbency Expressed as Ratio of Measured Absorbencies |
|---|---|
| 1 | 9.0/3.9 |
| 2 | 9.0/3.7 |
| 3 | 9.0/3.9 |
| 4 | Not measured |
| 5 | Not measured |
| 6 | 9.0/3.7 |
| 7 | 9.0/3.85 |
| 8 | 9.0/3.8 |
| 9 | 9.0/2.95 |
| 10 | 9.0/4.2 |
| 11 | Not measured |
| 12 | Not measured |
| 13 | 9.0/4.4 |
| 14 | 9.0/3.85 |
| 15 | 9.0/3.0 |
| 16 | 8.6/3.15 |
| 17 | 8.2/3.05 |
| 18 | Not measured |
| 19 | Not measured |
| 20 | 8.4/2.8 |
| 21 | 8.0/2.6 |

*Analysis made using distilled water.

Example 4

Citrus peel was milled to about 60 mesh or less, using a fine grind air swept mill (Stedman). Milled citrus peel was then mixed with AGM and activated charcoal, with pre-gelatinized starch to inhibit clump formation, at a ratio of 88:3:2:5, respectively. Water at ambient temperature was added to the mix at a level adjusted to achieve good pelletization (generally 10% of the dry mix level). Water content was determined to affect product porosity, and therefore moisture migration, since a more porous pellet would likely produce faster moisture migration.

The mix was pelletized into cylinders with a 2×3 mm dimension by processing the mix through an LCI Model 14-171 pelletizer. The compression ratio was 4:1, and could be varied to effect pellet porosity. The pellets were then dried to less than 5% moisture in a drying oven.

The description and examples of the present invention are not intended to be limiting, and it should be recognized that modifications of the composition and method of the present invention can be made by those of skill in the art, given the disclosure herein, without falling outside the scope of this invention.

What is claimed is:

1. An absorbent particle comprising at least one moderate absorption carrier and at least one high-capacity absorption material, wherein the amount of the moderate absorption carrier is present in the particle in an amount that is at least twice the amount of the high-capacity absorption material, wherein said high-capacity absorption material comprises a hydrogel-forming polymer wherein the moderate absorption carrier is agglomerated with the high-capacity absorption material wherein the high capacity absorption material is sequestered within the agglomerate; and wherein said particle further comprises an odor-reducing element and further wherein the hydration capacity of the high-capacity absorption material is at least about 2 times greater than the hydration capacity of the moderate absorption carrier.

2. The particle of claim 1, further comprising an antimicrobial agent.

3. The particle of claim 1, further comprising an antifungal agent.

4. The particle of claim 1, wherein the particle size is less than about 40 mesh.

5. The particle of claim 1, wherein the particle size is less than approximately 60 mesh.

6. The particle of claim 1, wherein the particle does not change size after exposure to liquid.

7. The particle of claim 1, wherein the particle does not contain bentonite or silica.

8. The particle of claim 1 wherein the hydration capacity of the high-capacity absorption material is at least about 8 times greater than the hydration capacity of the moderate absorption carrier.

9. The particle of claim 1, wherein the moderate absorption carrier provides a rapid uptake of liquid when exposed to liquid material.

* * * * *

UNITED STATES PATENT AND TRADEMARK OFFICE
CERTIFICATE OF CORRECTION

PATENT NO. : 7,475,655 B2
APPLICATION NO. : 11/348874
DATED : January 13, 2009
INVENTOR(S) : Vincent Y. Wong et al.

It is certified that error appears in the above-identified patent and that said Letters Patent is hereby corrected as shown below:

Column 4

Line 43, after "6-8" insert -- ml --.

Column 5

Line 29, delete "high-capacityabsorbent" and insert -- high-capacity absorbent --.

Column 8

Line 31, delete "82,201" and insert -- 82, 201 --.

Signed and Sealed this

Twenty-fifth Day of August, 2009

David J. Kappos
*Director of the United States Patent and Trademark Office*